United States Patent
Boettcher (10) Patent No.: US 7,525,708 B2
(45) Date of Patent: Apr. 28, 2009

(54) SCANNER HEAD FOR A LASER MACHINING DEVICE

(75) Inventor: Christian Boettcher, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 12/141,415

(22) Filed: Jun. 18, 2008

(65) Prior Publication Data

US 2008/0259425 A1  Oct. 23, 2008

Related U.S. Application Data

(63) Continuation-in-part of application No. PCT/EP2005/013987, filed on Dec. 23, 2005.

(51) Int. Cl.
*G02B 26/08* (2006.01)
*B23K 26/06* (2006.01)

(52) U.S. Cl. .................. 359/202; 359/201; 359/205; 359/900; 219/121.74; 219/121.8

(58) Field of Classification Search ............... 359/202; 219/121.74, 121.8
See application file for complete search history.

(56) References Cited

U.S. PATENT DOCUMENTS

| 7,102,806 B2 | 9/2006 | Boettcher |
| 2002/0104834 A1 | 8/2002 | Mangiarino et al. |
| 2005/0002078 A1 | 1/2005 | Boettcher |
| 2006/0001990 A1 | 1/2006 | Andreasch et al. |

FOREIGN PATENT DOCUMENTS

| DE | 10027148 | 12/2001 |
| DE | 20212155 | 9/2002 |
| DE | 10252443 | 5/2004 |
| EP | 1228835 | 8/2002 |
| EP | 1424584 | 6/2004 |

OTHER PUBLICATIONS

International Search Report and Written Opinion for corresponding PCT Application No. PCT/EP2005/013987, mailed Sep. 4, 2006, 11 pages.
Notification of Transmittal of copies of Translation of the International Preliminary Report on Patentability from corresponding PCT Application No. PCT/EP2005/013987, mailed Sep. 12, 2008, 8 pages.

*Primary Examiner*—James Phan
(74) *Attorney, Agent, or Firm*—Fish & Richardson P.C.

(57) ABSTRACT

A scanner head is provided for processing a workpiece by means of a focused laser beam. The scanner head includes a first module, rotatably supported in a first direction in order to deflect the laser beam from the first direction into a second direction, preferably perpendicular to the first direction, and a second module, which is fixed to the first module and is rotatably supported in the second direction, and which has a scanner mirror capable of tilting about a first axis. An adaptive beam deflection unit, which may include an adaptive mirror, is provided in the first module. The scanner mirror is arranged in the second module so that it can rotate or tilt about a second axis, and an optical arrangement with a beam expansion element and a focusing element is arranged in the scanner head.

22 Claims, 10 Drawing Sheets

SCANNER HEAD FOR A LASER MACHINING DEVICE

CROSS-REFERENCE TO RELATED APPLICATION

This application is a continuation-in-part of and claims priority under 35 U.S.C. § 120 to PCT Application No. PCT/EP2005/013987, filed on Dec. 23, 2005. The contents of this priority application is hereby incorporated by reference in its entirety.

TECHNICAL FIELD

The present invention relates to a scanner head for processing a workpiece by means of a focused laser beam, the scanner head including a first module, rotatably supported in a first direction in order to deflect the laser beam from the first direction into a second direction, preferably perpendicular to the first direction, and a second module, which is fixed to the first module and is rotatably supported in the second direction, and which has a scanner mirror capable of tilting about a first axis. The invention also relates to processing machines that include such a scanner head.

BACKGROUND

As used in this application, the term "scanner head" refers to a sub-assembly which can be supported on a 3D laser processing system or an industrial robot (as an end effector), so that it can rotate about the first and second direction referred to above, a generally collimated laser beam being delivered to the scanner head.

Such a scanner head is described in EP 1 228 835. The laser beam there is focused onto a focal point by means of a displaceable lens, around which a two-dimensional, arched (spherical shell-shaped) working field is produced through rotation of the scanner mirror about the second direction or a tilting thereof. By moving the lens, it is possible to adjust the spatial position of the focal point, so that the working field is expanded into a working space.

DE 100 27 148 A1 discloses a device for processing a workpiece, in which a moveable adjustable scanner mirror is arranged in the beam path. A moveable scanner mirror is there taken to mean a scanner mirror having a moveable suspension, for example a cardan suspension. The adjustability of the mirror is achieved by a tilting of the mirror about two axes perpendicular to one another.

A disadvantage of the scanner head described there and of other, conventional scanner devices is that the direction of incidence of the focused laser beam is oriented substantially perpendicular to the working field of the scanner. The scanner is thereby primarily suited to plane processing, which means that for three dimensional processing additional axial movements of the workpiece are generally necessary.

SUMMARY

The present invention features a scanner head of the aforementioned type in which a largely free, three-dimensional orientation of the position of the focal point and hence of the working space can be achieved as easily and rapidly as possible.

This three-dimensional orientation is achieved by a scanner head of the aforementioned type, in which an adaptive beam deflection unit, in particular an adaptive mirror, is provided in the first module, the scanner mirror being arranged in the second module so that it can rotate or tilt about a second axis perpendicular to the first axis, and an optical arrangement with a beam expansion element and a focusing element is arranged in the scanner head.

The adaptive beam deflection unit serves to combine the beam deflection at a large angle (approx. 90°) with variation of the focal position of the laser beam in the direction of the beam. An adaptive mirror serving as adaptive beam deflection unit is disclosed by the applicant's U.S. Pat. No. 7,102,806, which is incorporated herein by reference. The adaptive mirror described there is aspherical and can be used for beam deflection by a large angle (approx. 90°), since the aspherical shape reduces the aberrations occurring in the deflection. The combination of a spherical deflection mirror with an additional deflection mirror, described as the prior art in U.S. Pat. No. 7,102,806, could alternatively be used as adaptive beam deflection unit, although this is not preferred.

By means of the adaptive beam deflection unit, as described above, it is possible to vary the focal position of the laser beam in the direction of the beam. A relevant, spatial extent in the direction of the beam is thereby imparted to the working field of the scanner, which for the moment (without focus adjustment) represents a section of a spherical shell, that is to say the working field becomes a working space. Moreover, through adjustment of the focal position in the direction of the beam, the (approximately) spherical working field of the scanner mirror is transformed into a plane working field, as is usual in scanners (cf. F/theta or plane field lens). The use of an adaptive optics obviates the need for an axis of displacement for the focal adjustment in the direction of the beam, as is necessary with the arrangement described in EP 1 228 835. In addition, with the scanner head disclosed herein the rotational movement of the second module for orientation of the scanner head is functionally separated from the rotational movement of the scanner mirror, since these rotational movements are technologically difficult to combine.

Besides the use of a single scanner mirror, capable of tilting about a first axis and rotating about a second axis, it is also possible to use two separate scanner mirrors, each capable of tilting about a single axis, in the scanner head. In contrast to EP 1 228 835, the provision of a further axis of rotation and/or tilt axis allows a separation into an axis of orientation for the working field and a rapid scanner axis. The suspension of a scanner mirror for tilting along two axes may be achieved, for example, as described in DE 102 52 443 A1 or DE 202 12 155 U1 of the present applicant.

In order to arrive at reasonable optical conditions which will allow remote welding with the usual laser beam input data, an optical arrangement is provided, which besides focusing of the laser beam by means of a focusing element, especially with an ellipsoidal mirror or a convergent lens, also expands the laser beam. This object is achieved by a beam expansion element, which is preferably embodied as a parabolic mirror or divergent lens. It may be advantageous, depending on the particular application, for the optical arrangement to be made up entirely of reflective elements or entirely of transmissive elements. In the former case the optical arrangement preferably comprises a parabolic mirror and an ellipsoidal mirror; in the later case it preferably comprises a divergent lens and a convergent lens. Optical arrangements in which reflective and transmissive elements are used in combination may also be advantageous, especially in order to compensate for a shift in the focal position due to thermal effects. The beam expansion and focusing functions may each be individually embodied by a single optical element or may take the form of a combination of multiple optical elements optimized in their respective function. All of these embodiments may be used in combination with a processing machine, which is preferably operated with a YAG laser or a $CO_2$ laser.

The focusing optical element focuses the laser beam onto a focal point. The latter is deflected by the scanner mirror(s) onto a working field, around which a working space is to be produced by the adaptive beam deflection unit, as described above.

As the scanner head moves along the Cartesian co-ordinate axes (X, Y, Z) of a Cartesian robot, the (limited) working space of the scanner is thus expanded to that of the basic machine and can moreover be freely oriented in three dimensions. In particular, a motor vehicle body, for example, can be processed on five sides if the scanner head is moved with a Cartesian robot.

In one embodiment the optical arrangement is arranged in the second module. In this case the scanner mirror(s) and the optical arrangement may be arranged in two separate sub-assemblies of the second module, the scanner mirror(s) being arranged in a separate scanner unit, for example, which is flange-mounted on the sub-assembly containing the optical arrangement.

Alternatively the scanner mirror(s) and the optical arrangement may be integrated in a common sub-assembly formed by the second module. This allows an especially compact configuration.

In a further embodiment the scanner mirror(s) is/are arranged in the second module eccentrically in relation to the second direction. In this case the laser beam may be deflected out of the second direction on to the scanner mirror, for example by means of a reflective optical element of the optical arrangement, which allows the scanner mirror to be arranged eccentrically in the second module. As the second module rotates about the second direction, the scanner mirror therefore describes a circular arc, thereby facilitating the free spatial orientation of the working field of the scanner.

In a further embodiment the laser beam is deflected from the first direction into the second direction both by the adaptive beam deflection unit and by the beam expansion element or the focusing element. The focusing or beam expansion element is in this case of reflective design and is arranged in the first module. The other element in the optical arrangement is also preferably arranged in the first module, this advantageously being of transmissive design. This arrangement leads to a compact scanner head configuration and in particular, one in which the length of the second module can be shortened. This reduces the swivel radius, which increases the positioning accuracy. The scanner mirror can furthermore be of smaller dimensions in this case.

In a preferred embodiment the scanner head is designed in such a way that the angle of incidence of the laser beam onto the scanner mirror is other than 45° when it is not tilted about the first axis, so as to fulfill the requirements with regards to polarization in certain welding processes. However, this increases the cost of the scanner mirror control (transformation).

The invention is further embodied in a processing machine for the three-dimensional processing of a workpiece using a scanner head as described above, which has a unit for displacement of the scanner head along Cartesian co-ordinate axes and angular mechanisms for rotatable support of the scanner head in the first and second direction. The principle of B/C axial kinematics for supporting the scanner head may be employed, in particular, when using a 3D processing machine of the applicant's TLC type, having three cartesian co-ordinate axes (X, Y, Z) and two axes of rotation (B, C).

The details of one or more embodiments of the invention are set forth in the accompanying drawings and the description below. Other features and advantages of the invention will be apparent from the description and drawings, and from the claims.

DETAILED DESCRIPTION

Figure 1A:
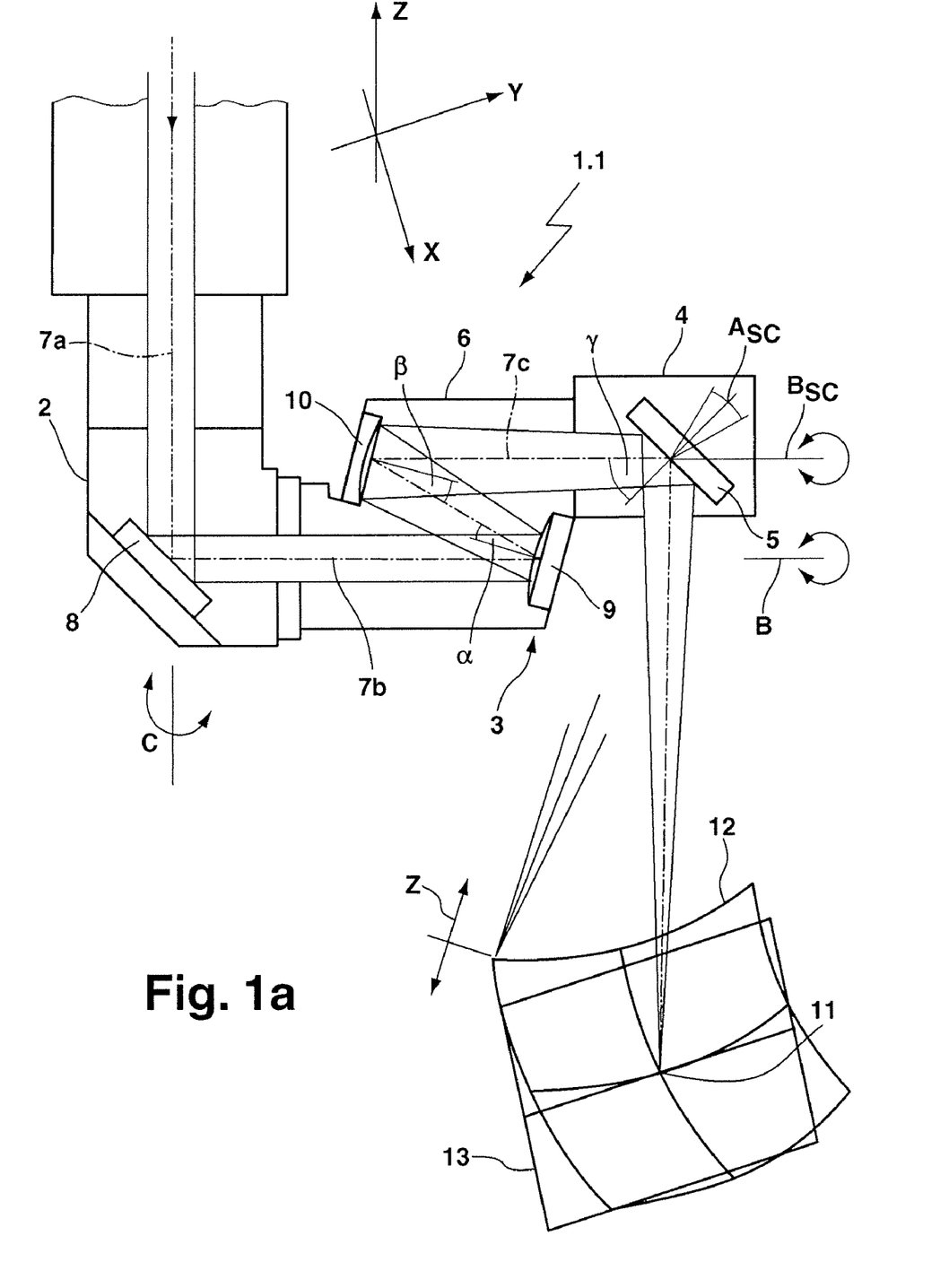
FIG. 1a shows, in a longitudinal section, a schematic representation of a first embodiment of the scanner head with a scanner unit flange-mounted on a reflective, optical arrangement.

FIG. 1 shows a scanner head 1.1, which comprises a first module 2, which is rotatably supported in a first, vertical direction C, and a second module 3, which is fixed to the first module 2 and is likewise rotatably supported about a second, horizontal direction B. The second module 3 has a scanner unit 4 with a scanner mirror 5, which is flange-mounted on the housing of an optical arrangement 6. The scanner head 1.1 is fitted to a processing machine, only part of which is shown in FIG. 1, which shows the three Cartesian co-ordinate axes X, Y, Z thereof.

A substantially collimated laser beam 7a enters the scanner head 1.1 at the first module 2, where it meets an adaptive deflection mirror 8 which deflects the laser beam 7a from the vertical direction C into the horizontal direction B. At the same time the deflection mirror 8 serves to vary the focal position of the laser beam in the direction of the beam, that is to say a collimated, convergent or divergent laser beam 7b is formed from the collimated laser beam 7a, depending on the adjustment of the adaptive mirror 8. For this purpose the deflection mirror 8 can be deformed, for example by piezo elements (not shown) or under the pressure of cooling water impinging on the rear of the mirror, as is described in more detail in U.S. Pat. No. 7,102,806, incorporated by reference above. With the adaptive mirror 8 it is possible to obtain typical minimum focal lengths of approximately 4000 mm.

Figure 1B:
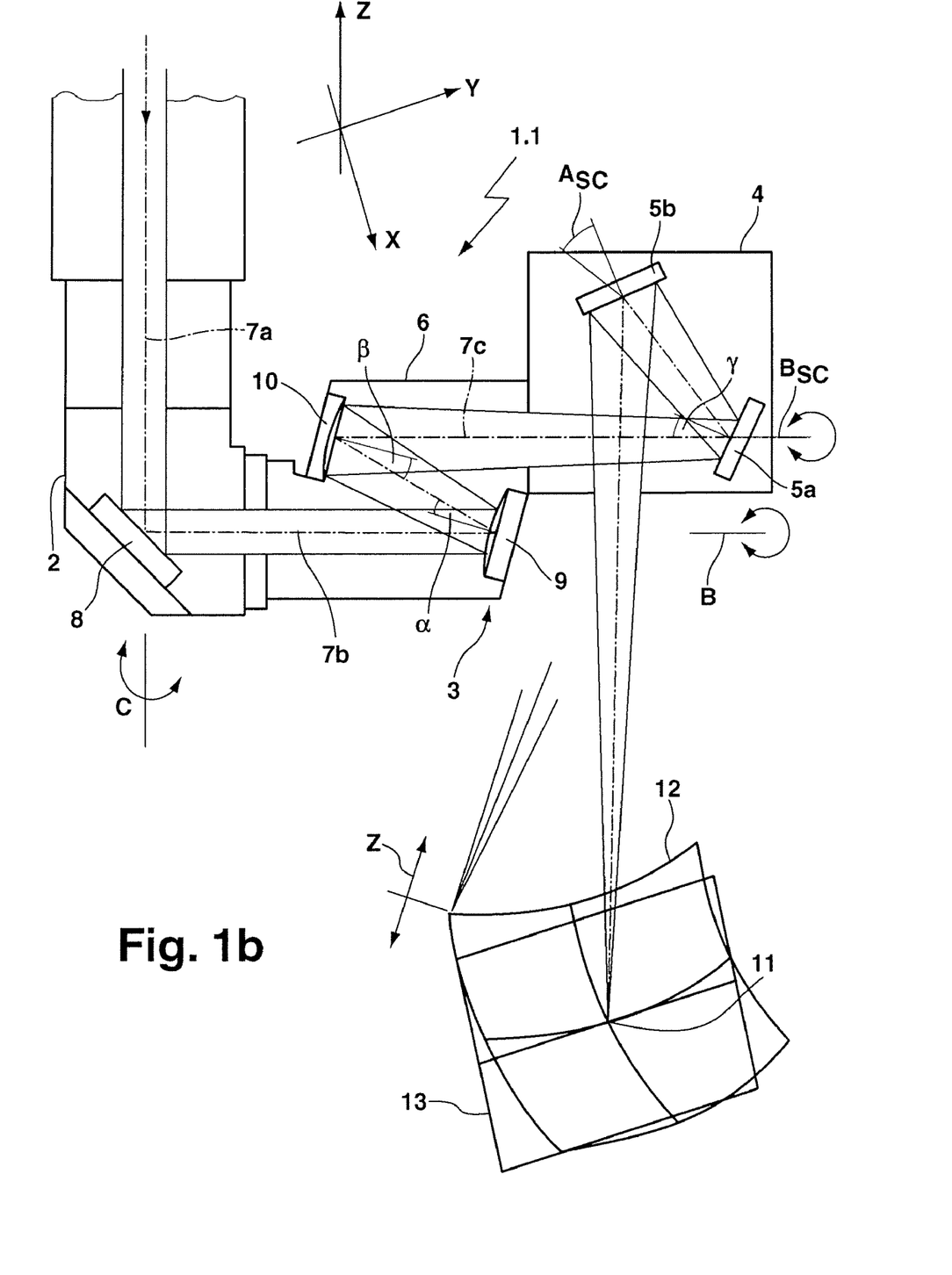
FIG. 1b is similar to FIG. 1a, but shows an alternate embodiment of the scanner head, which includes two scanner mirrors.

The horizontally oriented laser beam 7b then enters the second module 3, where it first meets an expanding parabolic mirror 9, which together with a following ellipsoidal mirror 10 in the beam path forms the optical arrangement 6. The focal length of the ellipsoidal mirror 10 (effective focal length approx. 800 mm) is here selected so that this has a focusing effect and produces a convergent laser beam 7c. The focused laser beam 7c then meets the scanner mirror 5, where it is again deflected before emerging from the scanner head 1.1. The laser beam then meets a workpiece (not represented) at a focal point 11. The scanner mirror 5 is capable of tilting about a first axis $A_{Sc}$, and is rotatable about a second axis $B_{Sc}$ perpendicular to the first axis. Alternatively, as shown in FIG. 1b, two scanner mirrors, which are each capable of tilting or rotating about axes perpendicular to one another, may also be provided in the scanner head 1.1. Referring to FIG. 1b, two mirrors 5b and 5a are provided, the first one (5b) being capable of tilting about the first axis $A_{Sc}$, the second one (5a) being capable of rotating about the second axis $B_{Sc}$.

The tilting and rotation of the scanner mirror 5 about the two axes $A_{Sc}$, $B_{Sc}$ produces the virtually spherical working field 12 at the focal point 11. By suitably varying the focal position by means of the adaptive deflection mirror 8, the initially spherical working field 12, which represents a section of a spherical shell, can be endowed with a relevant three-dimensional extent in the direction of the beam, which along the Z axis has a height of $\Delta Z$=about 150 mm to about 200 mm. The Z adjustment of the focus also allows a plane working field 13 of about 350 mm by 350 mm (X/Y) to be formed from the approximately spherical working field of the scanner mirror 5, as is usual for scanners (cf. plane field lens).

For easier three-dimensional orientation of the working field 12, the scanner mirror 5 is arranged eccentrically about the axis B, so that the mirror can be rotated about the B axis with a small swivel radius of approx. 600 to 700 mm. This additional flexibility is achieved in that the laser beam 7c is shifted parallel to the B direction by means of the optical arrangement 6, so that the scanner mirror 5 and the second module 3 are rotatable about spatially separated axes B and $B_{Sc}$, respectively.

The angle of incidence α against the parabolic mirror 9 and the angle of incidence β against the ellipsoidal mirror 10 have purposely not been further specified, since these vary as a function of geometric requirements. Only the angle of incidence γ of the laser beam 7b against the scanner mirror 5 is set to approx. 45°, which makes it easier to control the scanner mirror.

Figure 2:
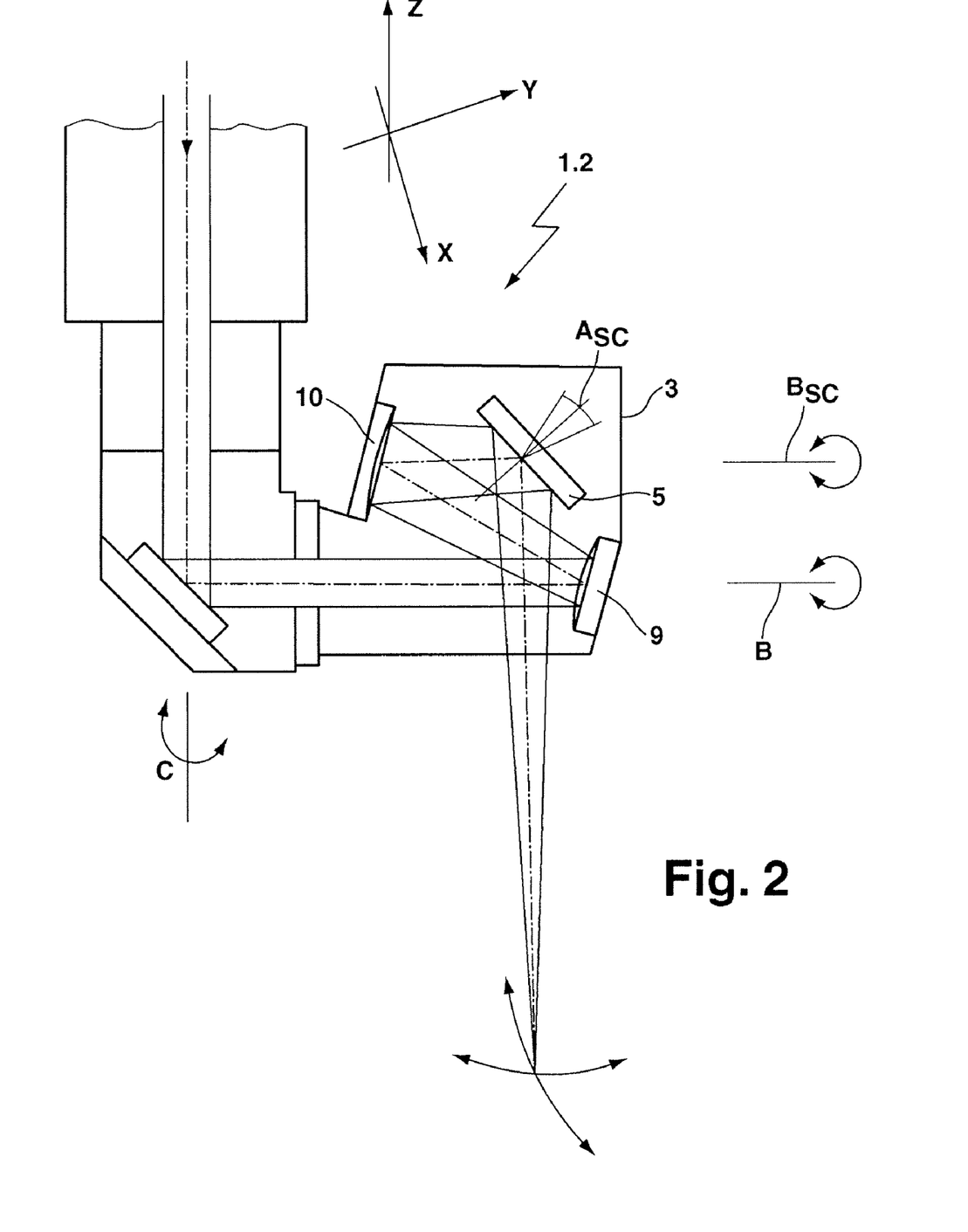
FIG. 2 shows a similar representation of a second embodiment of the scanner head in compact design form.

FIG. 2 shows a configuration of a scanner head 1.2, which differs from the scanner head 1.1 in FIG. 1 in that the parabolic mirror 9 and the ellipsoidal mirror 10 together with the scanner mirror 5 are arranged in a common sub-assembly, which is formed by the second module 3. As a result a more compact construction is achieved, compared to FIG. 1.

Figure 3:
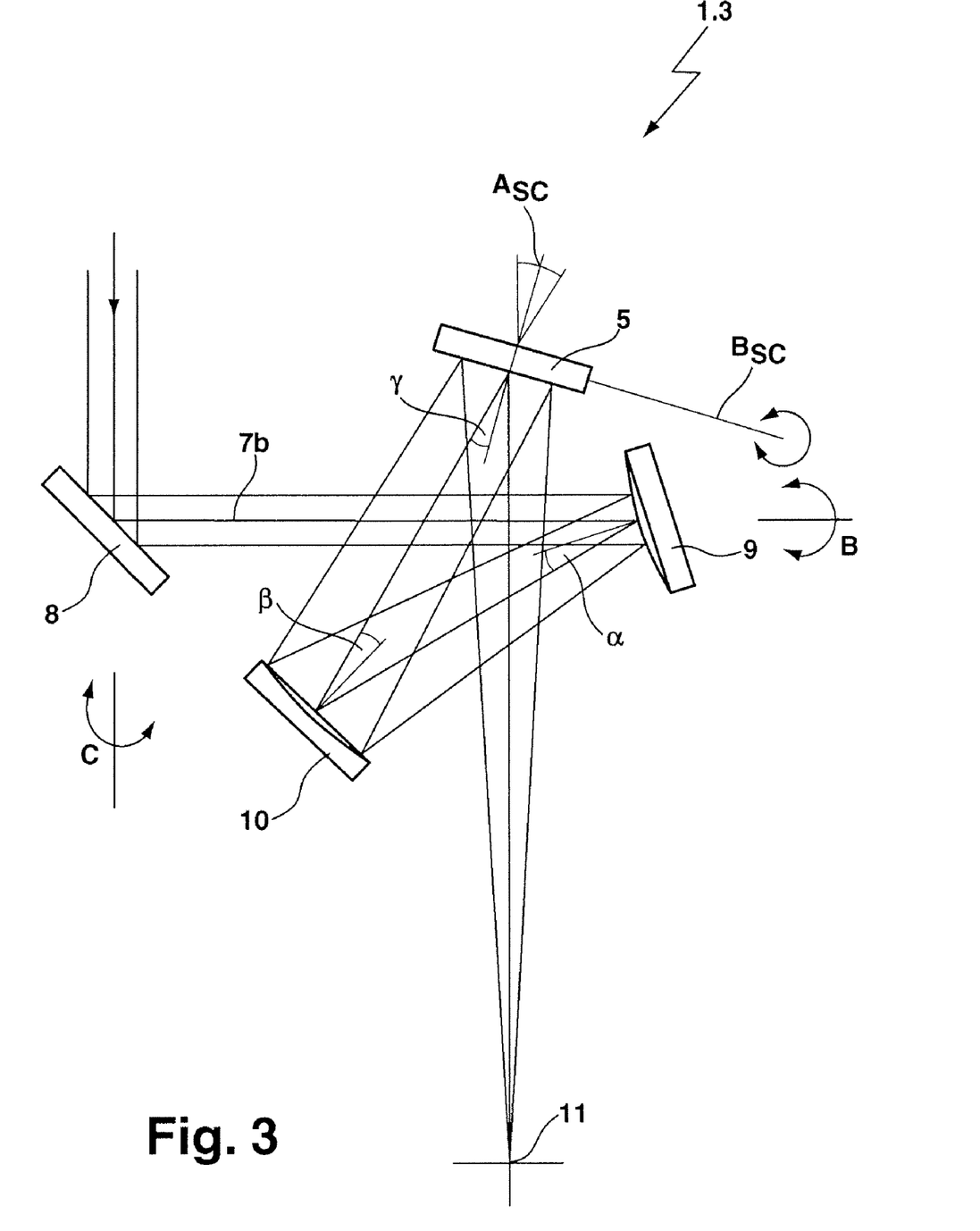
FIG. 3 shows a schematic representation of the optical components of a third embodiment of the scanner head with a non right-angled beam deflection on the scanner mirror.

For the sake of simplicity, FIG. 3 shows only the optical components of another configuration of the scanner head 1.3, in which the selected angles of incidence α, β, γ of the laser beam 7b, focused on the adaptive deflection mirror 8, against the parabolic mirror 9, the ellipsoidal mirror 10 and the scanner mirror 5 are other than 45°. This configuration differs in particular, therefore, from that represented in FIG. 1 and FIG. 2 in that there is no 90° deflection at the scanner mirror 5. In certain welding processes, this may have an advantageous effect on the polarization of the laser beam 7b. In particular, the three angles of incidence α, β, γ may be selected in such a way that the desired polarization conditions of the laser beam 7b result at the focal point 11.

The configurations of the scanner head 1.1 to 1.3 shown in FIG. 1 to FIG. 3 show an optical arrangement 6 as reflective optics. Depending on the particular application, it may be more advantageous to replace these reflective optics with transmissive optics, as is the case in a scanner head 1.4 shown in FIG. 4. The arrangement 6 shown there, comprising a divergent lens 9' and a following convergent lens 10' in the beam path, is arranged in the second module 3. In this configuration the second axis $B_{Sc}$, about which the scanner mirror 5 is rotatable, coincides with the second direction B, about which the second module 3" is rotatably supported. Otherwise the construction of the scanner head 1.4 of FIG. 4 corresponds to the scanner head 1.1 shown in FIG. 1.

Figure 4:
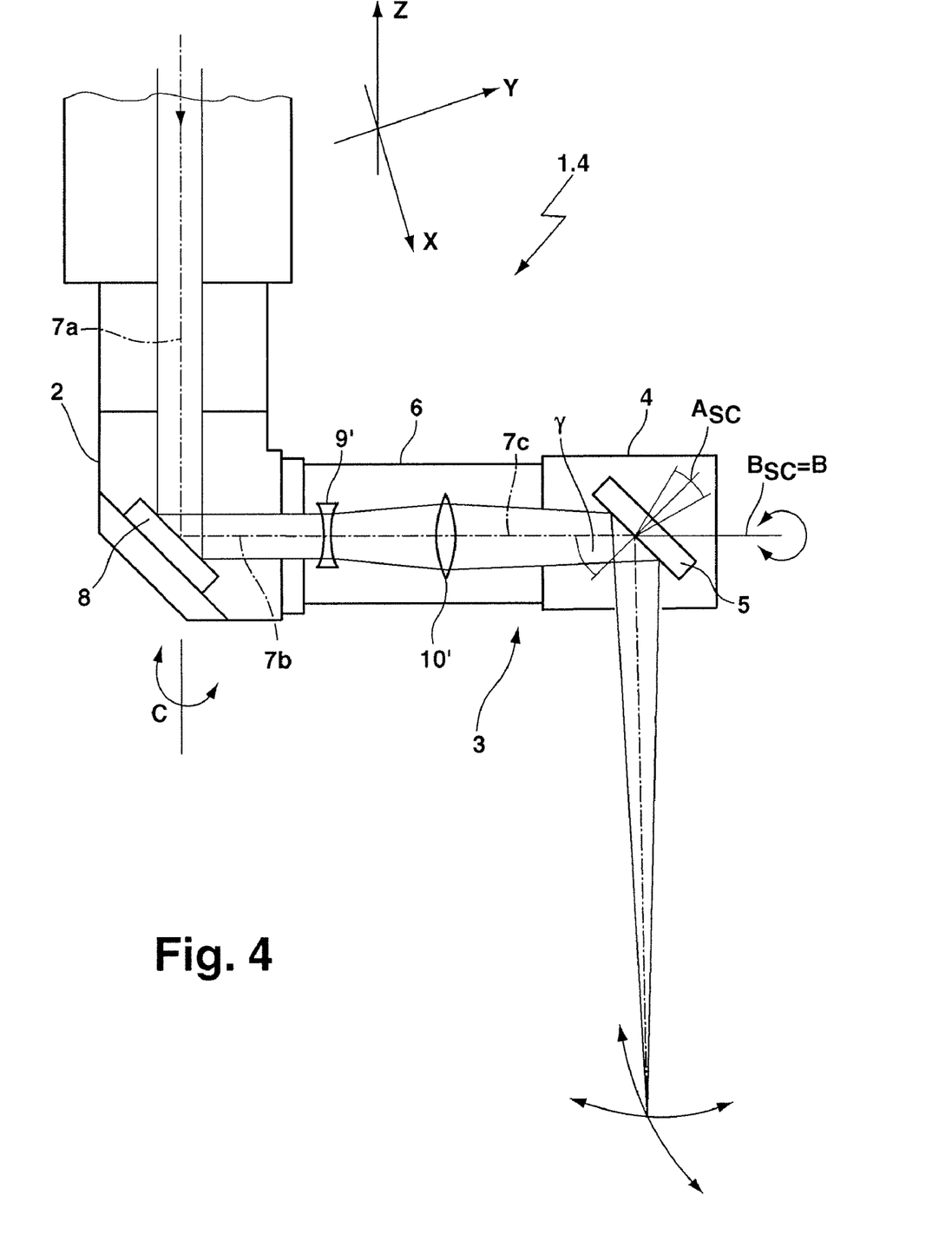
FIG. 4 shows, in a longitudinal section, a schematic representation of the optical components of a fourth embodiment of the scanner head with a transmissive optical arrangement.
Figure 5:
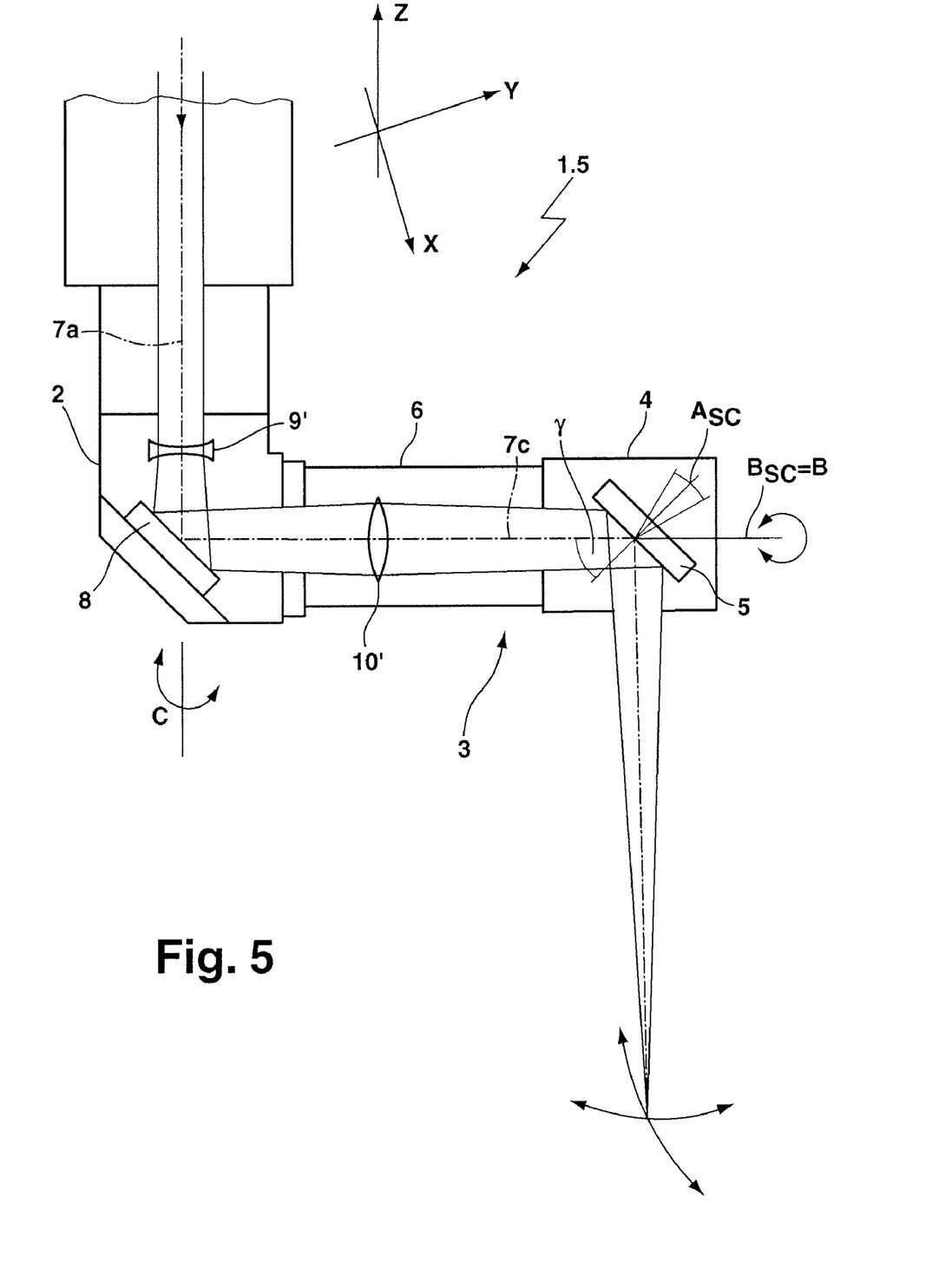
FIG. 5 shows a similar representation of a fifth embodiment of the scanner head with a transmissive optical arrangement, in which an adaptive mirror is arranged in the beam path between a divergent lens and a convergent lens.

Like FIG. 4, FIG. 5 shows a scanner head 1.5 with a transmissive optical arrangement 6. In contrast to FIG. 4, the divergent lens 9' here is arranged in the beam path in front of the adaptive mirror 8 in the first module 2, whereas the convergent lens 10' following in the beam path is arranged in the second module 3. This means that the adaptive mirror 8 is arranged in the divergent beam path, so that a more compact construction of the scanner head 1.5 may be achieved.

In the configurations of the scanner head 1.1 to 1.5 shown in FIG. 1 to FIG. 5, the 90° deflection of the laser beam 7a from the first direction C into the second direction B is produced exclusively by the adaptive mirror 8. In alternative configurations, like those shown in FIG. 6 to FIG. 9, the beam deflection may also be achieved through a combination of deflection by the adaptive mirror 8 and a reflective optical element of the optical arrangement 6.

Figure 6:
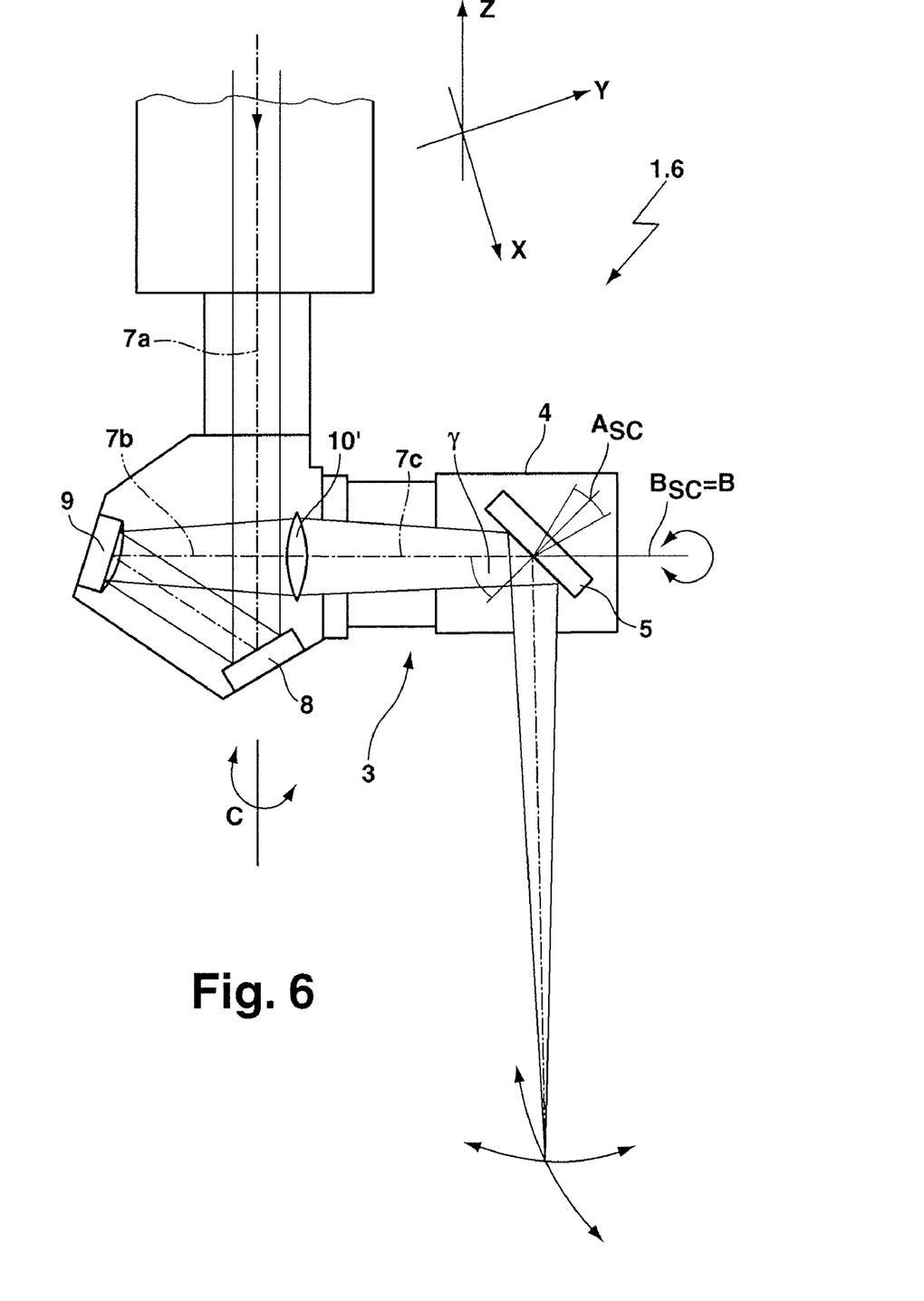
FIG. 6 shows a similar representation of a sixth embodiment of the scanner head with a parabolic mirror and a convergent lens in the beam path after the adaptive mirror.

FIG. 6 shows a configuration of the scanner mirror 1.6, in which an adaptive mirror 8 and a parabolic mirror 9 are used for the deflection from the first direction C into the second direction B. The laser beam 7b running in the second direction B is focused by a convergent lens 10' and the resulting convergent beam 7c meets the scanner mirror 5. The parabolic mirror 9 and the convergent lens 10' are arranged in the first module 2. As a result the second module 3 can be of shorter design in a horizontal direction than the designs in FIG. 1 to FIG. 5, so that the swivel radius of the scanner head 1.6 is reduced and the scanner mirror 5 can be of smaller dimensions. Furthermore, by combining a reflective element (parabolic mirror 9) with a transmissive element (convergent lens 10') a displacement of the focal position due to thermal effects can be at least partially compensated for.

Figure 7:
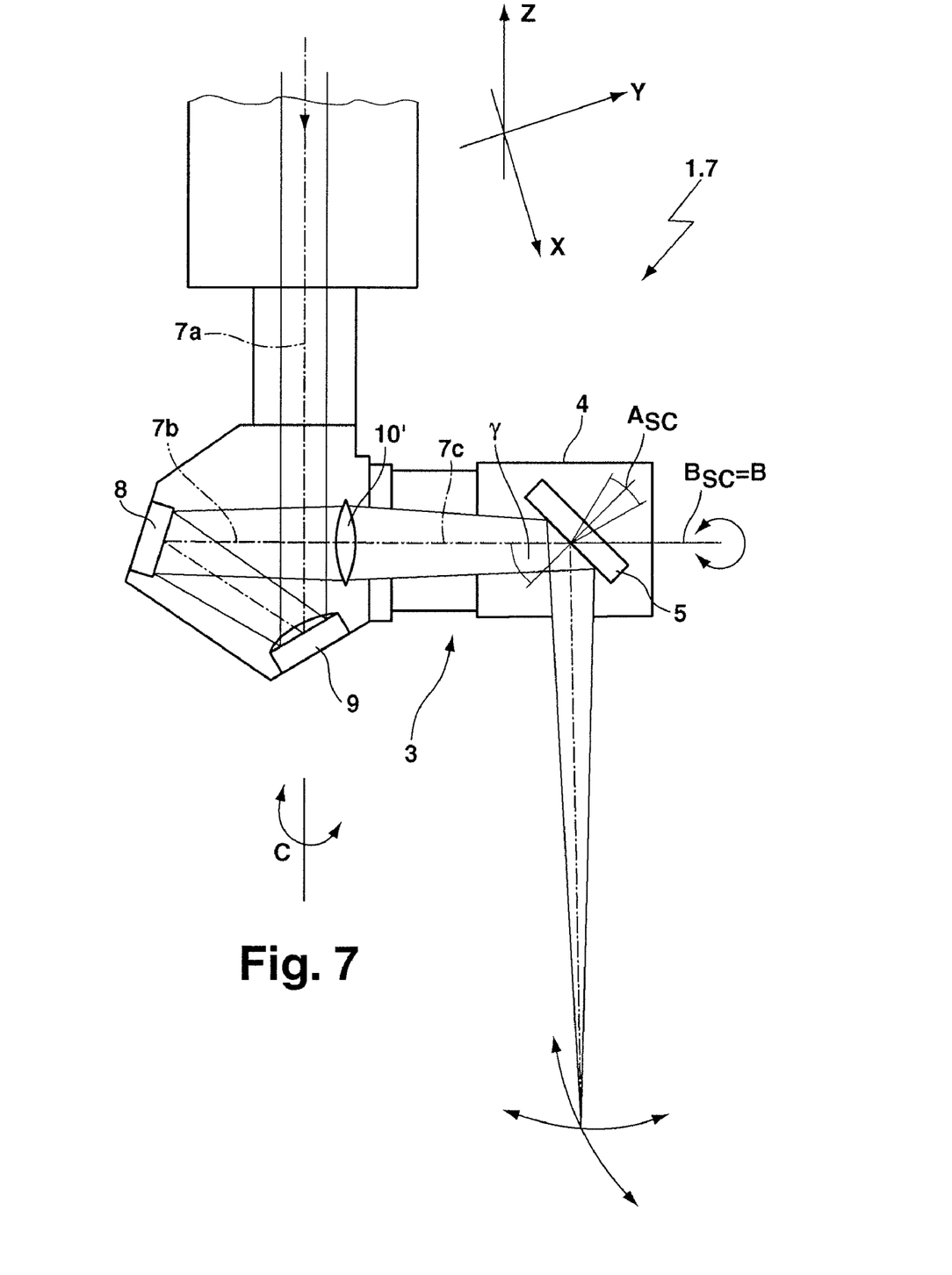
FIG. 7 shows a similar representation of a seventh embodiment of the scanner head with an adaptive mirror in the beam path between a parabolic mirror and a convergent lens.

A configuration of the scanner head 1.7 shown in FIG. 7 differs from the configuration in FIG. 6 merely in that the arrangement of the adaptive mirror 8 and the parabolic mirror 9 are reversed. The adaptive mirror 8 is thereby arranged in the beam path between the parabolic mirror 9 and the convergent lens 10'.

Figure 8:
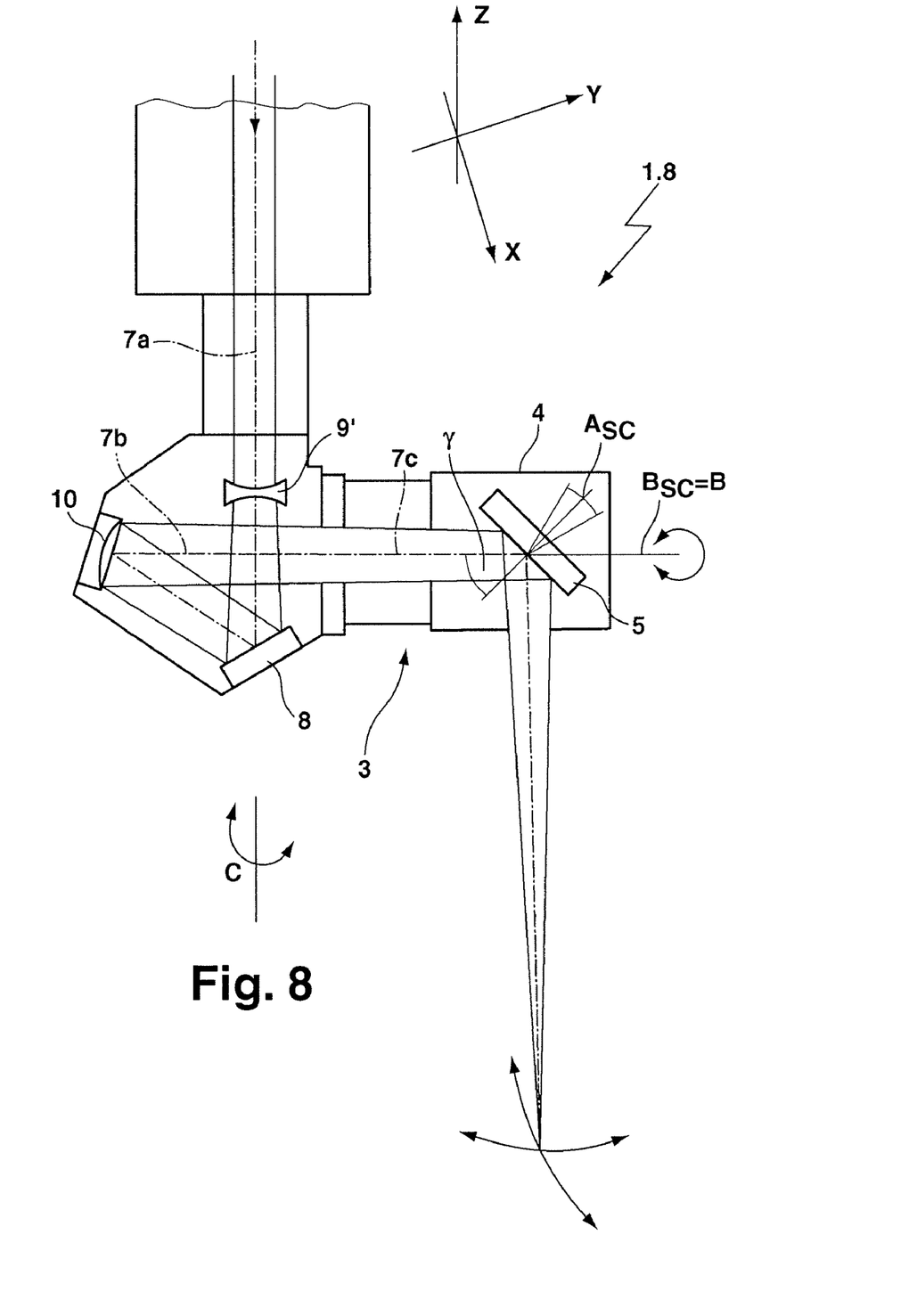
FIG. 8 shows a similar representation of an eighth embodiment of the scanner head with an adaptive mirror in the beam path between a divergent lens and an ellipsoidal mirror.

In a configuration of the scanner head 1.8 shown in FIG. 8, a divergent lens 9', which expands the laser beam 7a, is arranged in the first module 2 in the beam path running in the first direction. The expanded laser beam 7a is deflected and focused at the adaptive mirror 8 and at an ellipsoidal mirror 10, so that it enters the second module 3 as a convergent laser beam 7c running in the second direction B.

Figure 9:
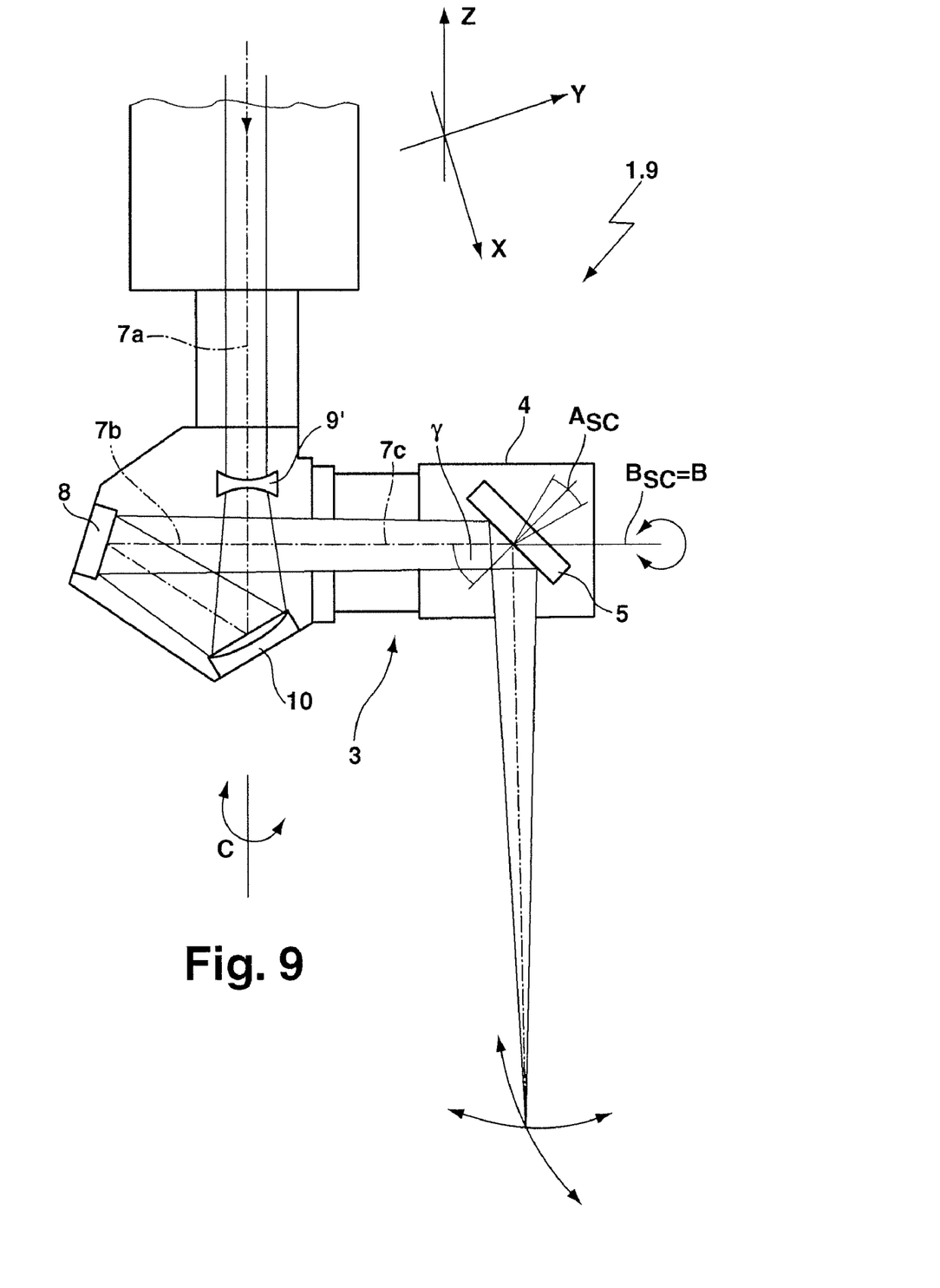
FIG. 9 shows a further similar representation of a ninth embodiment of the scanner head with a divergent lens and an ellipsoidal mirror in the beam path before the adaptive mirror.

A further configuration of the scanner head 1.9 differs from the configuration shown in FIG. 8 merely in that the position of the adaptive mirror 8 and of the ellipsoidal mirror 10 in the first module 2 are reversed, so that the adaptive mirror 8 lies in the beam path after the divergent lens 9' and the ellipsoidal mirror 10, with the result that a convergent, expanded laser beam is incident upon this mirror.

The positions of the adaptive mirror 8 and the ellipsoidal mirror 10 or the parabolic mirror 9 relative to one another and to the incident laser beam 7a in FIG. 6 to FIG. 9 are each selected in such a way that through the combination of both elements a 90° deflection is achieved. All configurations shown in FIG. 1 to FIG. 9 can advantageously be operated with a suitable processing laser, in particular a $CO_2$ laser or a YAG laser.

In the configurations of the scanner head 1.1 to 1.9 shown, the variation of the focal position in the direction of the beam is achieved by the adaptive mirror 8. This variation takes place about the focal point 11, which is situated at a nominal focal length of the scanner head 1.1 to 1.9, which is fixed by the focusing lens element 10' or the mirror element 10 of the optical arrangement 6. The fact that a nominal focal length is fixed by means of the optical arrangement 6 means that it is sufficient for the pressure acting on the adaptive mirror 6 to produce only a slight refractive power (corresponding to a large (positive or negative) focal length). The adaptive mirror 8 is also capable of producing a more rapid variation of the focal position in the Z direction than could be achieved through a displacement of lenses or mirrors, for example, since owing to their mass these are usually too slow-acting for rapid displacements.

The configurations of the scanner head 1.1 to 1.9 shown in FIG. 1 to FIG. 9 can each most advantageously be fitted as a working unit to a processing machine for the three-dimensional processing of a workpiece, especially a TLC machine or an industrial robot, if the processing machine has a unit for displacement of the scanner head 1.1 to 1.9 in the first and second direction B, C and a radiation source for generating the laser beam. With such a processing machine it is possible, for example, to process a motor vehicle body on five sides using one of the configurations of the scanner head 1.1 to 1.9.

A number of embodiments of the invention have been described. Nevertheless, it will be understood that various modifications may be made without departing from the spirit and scope of the invention. Accordingly, other embodiments are within the scope of the following claims.

What is claimed is:

1. A scanner head for processing a workpiece by means of a focused laser beam, the scanner head comprising:
    a first module, rotatably supported in a first direction to deflect the laser beam from the first direction into a second direction,
    a second module, which is fixed to the first module and is rotatably supported in the second direction, and which has a scanner mirror capable of tilting about a first axis, the scanner mirror being arranged in the second module so that the scanner mirror can rotate or tilt about a second axis perpendicular to the first axis,
    an adaptive beam deflection unit, provided in the first module, and
    an optical arrangement, arranged within the scanner head, the optical arrangement including a beam expansion element and a focusing element.

2. The scanner head of claim 1 wherein the adaptive beam deflection unit comprises an adaptive mirror.

3. The scanner head of claim 1, wherein the second direction is perpendicular to the first direction.

4. The scanner head of claim 1, wherein the scanner head comprises two scanner mirrors.

5. The scanner head of claim 4, wherein the scanner mirrors are each capable of tilting or rotating about axes perpendicular to one another.

6. The scanner head according to claim 1, characterized in that the optical arrangement comprises a parabolic mirror as the beam expansion element.

7. The scanner head according to claim 1, characterized in that the optical arrangement comprises a divergent lens as the beam expansion element.

8. The scanner head according to claim 1, characterized in that the optical arrangement comprises an ellipsoidal mirror as the focusing element.

9. The scanner head according to claim 1, characterized in that the optical arrangement comprises a convergent lens as the focusing element.

10. The scanner head according to claim 1, characterized in that the optical arrangement is arranged in the second module.

11. The scanner head according to claim 10, characterized in that the scanner mirror and the optical arrangement are arranged in two separate sub-assemblies.

12. The scanner head according to claim 10, characterized in that the scanner mirror and the optical arrangement are integrated in a common sub-assembly, which is formed by the second module.

13. The scanner head according to claim 1, characterized in that the scanner mirror in the second module is arranged eccentrically in relation to the second direction.

14. The scanner head according to claim 1, characterized in that the laser beam is deflected from the first direction into the second direction by both (a) the adaptive beam deflection unit and (b) the beam expansion element or the focusing element.

15. The scanner head according to claim 12, characterized in that the optical arrangement is arranged in the first module.

16. The scanner head according to claim 1, characterized in that one of the beam expansion element and the focusing element is a transmissive element and the other is a reflective element.

17. The scanner head according to claim 1, characterized in that the scanner head is configured so that the angle of incidence ($\gamma$) of the laser beam against the scanner mirror is other than 45° when the scanner mirror is not tilted about the first axis ($A_{Sc}$).

18. A processing machine for three-dimensional processing of a workpiece using a focused laser beam, the machine comprising:
    (a) a scanner head comprising:
        a first module, rotatably supported in a first direction to deflect the laser beam from the first direction into a second direction,
        a second module, which is fixed to the first module and is rotatably supported in the second direction, and which has a scanner mirror capable of tilting about a first axis, the scanner mirror being arranged in the second module so that the scanner mirror can rotate or tilt about a second axis perpendicular to the first axis,
        an adaptive beam deflection unit, provided in the first module, and
        an optical arrangement, arranged within the scanner head, the optical arrangement including a beam expansion element and a focusing element,
    (b) a unit for displacement of the scanner head along Cartesian co-ordinate axes (X, Y, Z); and
    (c) angular mechanisms for rotatable support of the scanner head in the first and second directions.

19. A processing machine according to claim 18 wherein the machine comprises a TLC machine or an industrial robot.

20. The processing machine of claim 18 wherein the adaptive beam deflection unit comprises an adaptive mirror.

21. A method for three-dimensional processing of a workpiece using a focused laser beam, the method comprising:
    (a) delivering the laser beam through a scanner head to form a working field, the scanner head comprising (i) a first module, rotatably supported in a first direction to deflect the laser beam from the first direction into a second direction, (ii) a second module, which is fixed to the first module and is rotatably supported in the second direction, and which has a scanner mirror capable of tilting about a first axis, the scanner mirror being arranged in the second module so that the scanner mirror can rotate or tilt about a second axis perpendicular to the first axis, (iii) an adaptive beam deflection unit, provided in the first module, and an optical arrangement, arranged within the scanner head, the optical arrangement including a beam expansion element and a focusing element; and (b) during delivery of the laser beam, displacing the scanner head along Cartesian co-ordinate axes (X, Y, Z).

22. The method of claim 21, further comprising adjusting the three-dimensional orientation of the working field by rotating the second module and/or the scanner mirror.

\* \* \* \* \*